United States Patent
Gisquet

(10) Patent No.: US 8,218,618 B2
(45) Date of Patent: Jul. 10, 2012

(54) METHOD AND DEVICE FOR LOSSY CODING OF A DIGITAL SIGNAL

(75) Inventor: Christophe Gisquet, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 981 days.

(21) Appl. No.: 12/184,415

(22) Filed: Aug. 1, 2008

(65) Prior Publication Data

US 2009/0034608 A1 Feb. 5, 2009

(30) Foreign Application Priority Data

Aug. 2, 2007 (FR) ...................................... 0756911

(51) Int. Cl.
*H04N 7/12* (2006.01)
(52) U.S. Cl. ................................................ 375/240.01
(58) Field of Classification Search ............. 375/240.01, 375/240.02, 240.12, 240.13
See application file for complete search history.

(56) References Cited

U.S. PATENT DOCUMENTS

| | | | |
|---|---|---|---|
| 5,978,029 A | 11/1999 | Boice et al. | 348/412 |
| 7,079,581 B2 | 7/2006 | Noh et al. | 375/240.16 |
| 2002/0131492 A1 | 9/2002 | Yokoyama | 375/240.03 |
| 2004/0184534 A1 | 9/2004 | Wang | 375/240.03 |
| 2006/0050789 A1 | 3/2006 | Gisquet et al. | 375/240.23 |
| 2006/0088221 A1 | 4/2006 | Henry et al. | 382/232 |
| 2006/0171456 A1 | 8/2006 | Kwon | 375/240.03 |
| 2007/0263720 A1* | 11/2007 | He | 375/240.03 |
| 2007/0280349 A1* | 12/2007 | Prieto et al. | 375/240.03 |
| 2010/0226262 A1* | 9/2010 | Liu et al. | 370/252 |

FOREIGN PATENT DOCUMENTS

| | | |
|---|---|---|
| EP | 1 615 447 A1 | 1/2006 |
| WO | 2004-023821 A1 | 3/2004 |
| WO | 2006-067373 A1 | 6/2006 |
| WO | 2007-070056 A1 | 6/2007 |

* cited by examiner

*Primary Examiner* — Frank Duong

(74) *Attorney, Agent, or Firm* — Fitzpatrick, Cella, Harper & Scinto

(57) ABSTRACT

Lossy coding of a digital signal for transmission over a communication system, involving determination of at least one coding parameter reducing the distortion due to the coding under a rate constraint by taking account of the possible variations over time of several parameters of the communication system among the bandwidth, the filling ratio, the processing load and the delay between the coding and the decoding.

17 Claims, 3 Drawing Sheets

METHOD AND DEVICE FOR LOSSY CODING OF A DIGITAL SIGNAL

The invention relates to a method and to a device for lossy coding of a digital signal to transmit through a communication system.

It is known that to transmit digital signals such as images and audio through a communication network with limited bandwidth, compression or coding of those signals must take place.

This coding is most commonly carried out with the loss of information.

Generally, a rate control algorithm is used to maximize the quality of the coded signal, while respecting the constraints linked to the limited bandwidth.

These bandwidth constraints result in a constraint on the authorized rate for the transmission of the information over the network.

This is why reference is made to maximizing the quality under a given rate constraint.

Furthermore, it is important to ensure that the quality of a coded signal is maintained over time at acceptable levels while avoiding quality level jumps which are often badly perceived by users.

This is the case for example with a video which is transmitted over a low bandwidth digital channel and in which the image jolts.

This unpleasantness is aggravated furthermore when the image jolts at a change of scene.

It is to be noted that it is sometimes even preferable to have, for a signal, a low but acceptable average quality level which continues over time rather than a quality level that is higher on average but accompanied, over time, by unpleasant quality level jumps.

From the document U.S. Pat. No. 5,978,029 there is known a method directed to optimizing the lossy coding quality in real time by modifying an initial quantization step size. This method prevents large jumps in quality but solely when the drop in quality exceeds a certain level. Above that threshold, a drop in quality may still occur. Moreover, an abrupt rise in quality is not taken into account. Furthermore, the limitation in the drop in quality is carried out to the detriment of the quality over the long term which must be reduced. This is because the limitation in the drop gives rise to an excess quantity of data to transmit which must, in the end, be absorbed by the network with the same authorized bandwidth set point.

From the document U.S. Pat. No. 7,079,581 there is also known a method of real time coding of a digital signal. This method calculates the variations in the quantization step size used for the coding from one image to another according to a real rate obtained, for the purpose of attaining a target rate.

This method however has the drawback of having a strong constraint on the target rate which strongly reduces the freedom to control the variations in the quantization step size, and, consequently, the quality of the signal. To be precise, if the real rate is very far from the target rate, the authorized variations in the quantization step size around the nominal value calculated by the rate control mechanism are very reduced.

Consequently, the methods of the prior art cited earlier do not enable good management of the quality of the signals to be ensured over time.

The present invention relates to a new method and a new device for lossy coding which takes account of the management of the coding quality over time.

According to a first aspect, the invention concerns a method of lossy coding of a digital signal to transmit over a communication system, characterized in that it comprises a step of determining at least one coding parameter which reduces (and possibly minimizes) the distortion due to the coding under a rate constraint while taking account of the possible variations over time of several parameters of the communication system, among the bandwidth, the filling ratio, the processing load and the delay between the coding and the decoding, Thus, estimation is made of the possible variations over time of one or of several parameters of the communication system which are liable to have an influence on the quality of the coded signal that is transmitted or to be transmitted and a coding parameter value is determined that is adapted to those variations and reduces (or even minimizes) the distortion under a rate constraint.

The possible variations over time of that parameter or of those parameters of the system are taken into account in the determination of the value of the coding parameter or parameters, which makes it possible to manage the quality of the coded signal over time. Potential sources of reduction in quality over time are thus controlled, which makes it possible to avoid unpleasant jumps in quality. The average quality of a coded signal may thereby be maintained over time.

According to a second aspect, the invention concerns a method of lossy coding of a digital signal to transmit over a communication system, characterized in that it comprises the following steps:

determining a first value of at least one coding parameter which reduces (and possibly minimizes) the distortion due to the coding under a rate constraint, determining the possible variations over time of several parameters of the communication system among the bandwidth, the filling ratio, the processing load and the delay between the coding and the decoding, determining the possible variations over time of the first value of said at least one coding parameter which are induced by the possible variations of said several parameters of the communication system, determining, on the basis of the possible variations of the first value so determined, a second value of said at least one coding parameter which reduces (or even minimizes) the distortion due to the coding under a rate constraint.

Thus, more particularly, the impact that the possible variations of the parameter or parameters of the system may have on the value of the coding parameter or parameters is estimated and a value is determined of that parameter or those parameters within the limit of the estimated variations and which reduces (or even minimizes) the distortion due to the coding under a rate constraint.

According to a feature, a coding parameter is the quantization step size used on coding.

According to a feature, a coding parameter is the coding mode used on coding, thus making it possible to know whether the use of a particular mode will not imply a high variation in quality (visible in certain cases when an image of intra type is generated instead of an image of inter type).

According to a feature, the digital signal is a video signal having images which comprise macroblocks, some macroblocks being coded with an intra type or inter type coding mode, a coding parameter being the ratio between the intra coded macroblocks and the inter coded macroblocks. This thus makes it possible to reach a compromise between quality and refreshing of the image by forcing the intra type coding of blocks (which technique is referred to as "intra refresh"). This refreshing technique make it possible to reinitialize erroneous regions after a decoding error due to a network loss or to a corruption of data during transmission.

In addition to the proportion between different types of macroblocks, the proportion between different types of images may be used as a coding parameter.

The size may also be envisaged of a region of the transformed data of a block, termed "dead zone", which corresponds to a set of coefficients of which the value is forced to zero after quantization.

According to a feature, said several parameters of the communication system are chosen from among at least one of the following parameters: bandwidth of the communication system, filling ratio of a buffer memory used before the transmission of the coded signal or on reception of the transmitted coded signal, processing load at the receiving device of the transmitted coded signal, and delay between the coding and decoding operations, thus making it possible to comply to the physical constraints/limits of the system.

According to a feature, the method comprises a step of determining an index i expressing the variability of said at least one parameter of the communication system. This index makes it possible to advantageously simplify the representation of the different possible variations and thus the method of calculating the final coding parameters.

Thus, this index makes it possible to be acquainted with the evolution of the parameter or parameters of the communication system, both regarding the direction of the variations of the parameter or parameters and regarding the speed of that evolution.

Thus index may thus be used to take a decision on the coding of the signal. For example, when the parameter or parameters of the system evolve rapidly and the variation generated risks affecting the quality of the signal transmitted or to be transmitted, the aforementioned index represents that rapid evolution.

Depending on that index and on the initial coding parameter or parameters (first value) modification may be made to the coding parameters used on coding to obtain a final coding parameter or parameters.

According to a feature, the step of determining the second value of said at least one coding parameter takes account of the index i determined.

A new value is thus determined of the value of the coding parameter or parameters in a manner adapted to the value of the index i The adapted coding thus takes account of the variations detected in the parameter or parameters of the system, while giving a distortion that is as small as possible taking into account the circumstances, this being under a rate constraint.

According to a feature, the index i is determined on the basis of several of the values of the bandwidth, of the filling ratio, of the processing load and of the delay between the coding and the decoding.

This index takes into account several parameters of the system in order to represent different sources which are liable to induce changes in quality of the signal at the time of its transmission or at the time of its decoding.

According to a feature, the index i is determined on the basis of at least one of the following operations carried out on several of the values of the bandwidth, of the filling ratio, of the processing load and of the delay between the coding and the decoding: summing of those values, average value of those values, minimum of those values and square root of the sum of the squares of those values.

The invention also concerns a device for lossy coding of a digital signal to transmit over a communication system, characterized in that it comprises means for determining at least one coding parameter which reduces (or even minimizes) the distortion due to the coding under a rate constraint while taking account of the possible variations over time of several parameters of the communication system among the bandwidth, the filling ratio, the processing load and the delay between the coding and the decoding.

More particularly, the invention concerns a device for lossy coding of a digital signal to transmit over a communication system, characterized in that it comprises:
  means for determining a first value of at least one coding parameter which reduces (and possibly minimizes) the distortion due to the coding under a rate constraint,
  means for determining the possible variations over time of several parameters of the communication system among the bandwidth, the filling ratio, the processing load and the delay between the coding and the decoding,
  means for determining the possible variations over time of the first value of said at least one coding parameter which are induced by the possible variations of said several parameters of the communication system,
  means for determining, on the basis of the possible variations of the first value so determined, a second value of said at least one coding parameter which reduces (and possibly minimizes) the distortion due to the coding under a rate constraint.

According to a feature, a coding parameter is the quantization step size.

According to a feature, a coding parameter is the coding mode.

According to a feature, the digital signal is a video signal having images which comprise macroblocks, some macroblocks being coded with an intra type or inter type coding mode, a coding parameter being the ratio between the intra coded macroblocks and the inter coded macroblocks.

According to a feature, said several parameters of the communication system are chosen from among at least one of the following parameters: bandwidth of the communication system, filling ratio of a buffer memory used before the transmission of the coded signal or on reception of the transmitted coded signal, processing load at the receiving device of the transmitted coded signal, and delay between the coding and the decoding.

According to a feature, the method comprises a step of determining an index i expressing the variability of said several parameters of the communication system.

According to a feature, the index i is determined on the basis of several of the values of the bandwidth, of the filling ratio, of the processing load and of the delay between the coding and the decoding.

According to a feature, the index i is determined on the basis of at least one of the following operations carried out on the values of the bandwidth, of the filling ratio, of the processing load and of the delay between the coding and the decoding: summing of those values, average value of those values, minimum of those values and square root of the sum of the squares of those values.

According to a feature, the means for determining the second value of said at least one coding parameter take account of the index i determined.

The invention also concerns an information storage means, which can be read by a computer or a microprocessor, containing code instructions of a computer program for executing the steps of the method according to the invention as for the one briefly set out above.

The invention is also is directed to a partially or totally removable information storage means which can be read by a computer or a microprocessor, containing code instructions of a computer program for executing the steps of the method according to the invention as for the one briefly set out above.

According to yet another aspect, the invention relates to a computer program which can be loaded into a programmable apparatus, containing sequences of instructions or portions of software code for implementing steps of the method according to the invention as briefly set out above, when said computer program is loaded and executed on the programmable apparatus.

As the features and advantages relating to the device according to the invention, to the information storage means and to the computer program are the same as those set out above concerning the method according to the invention, they will not be repeated here.

Other features and advantages will appear in the following description, which is given solely by way of non-limiting example and made with reference to the accompanying drawings, in which.

Figure 1:
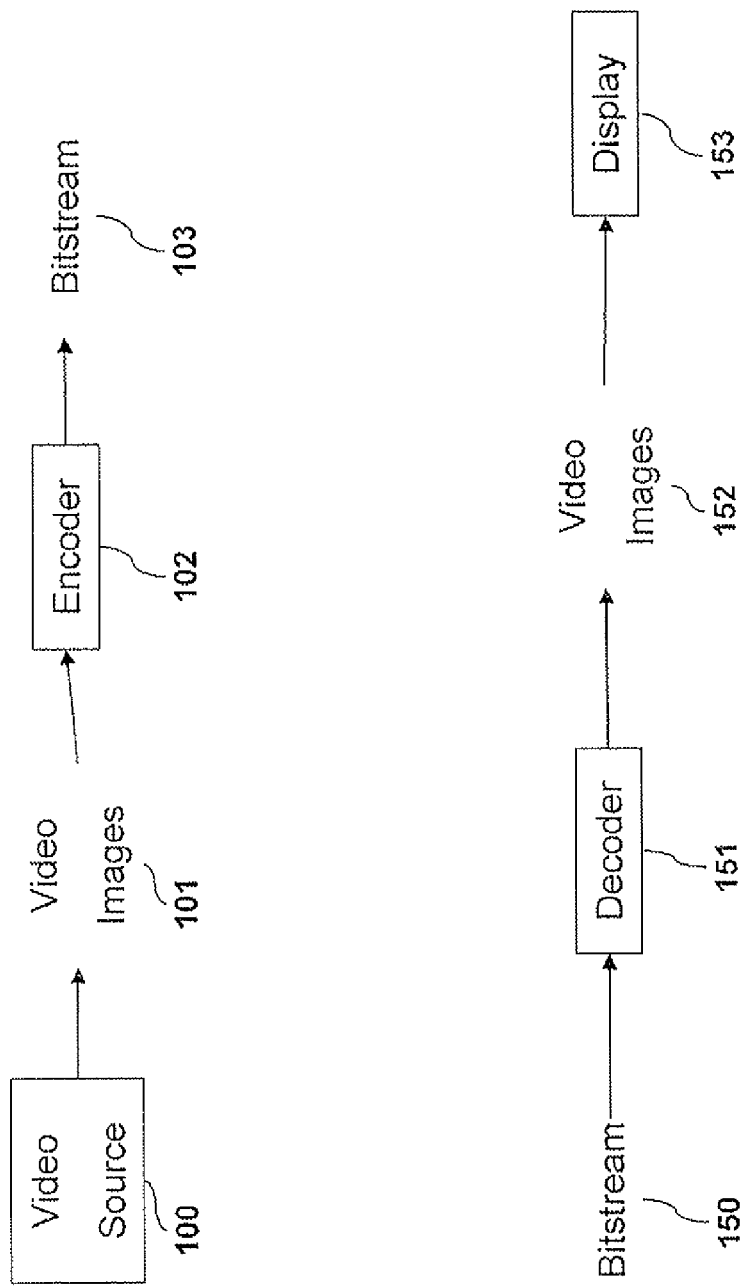
FIG. 1 is a diagrammatic representation of an implementation context of the invention.

As represented in FIG. 1, a source of data 100 (digital signal), for example, a video signal 101 supplies images of the video sequence to a coding device or coder 102.

It will be noted that the signal stored in the source 100 may be obtained by the latter in various ways, for example, by capture if it is a video camera or by transmission from another source (for example a database).

The coder 102 carries out lossy coding of the digital signal 101 in order to transform it into a bitstream 103 intended to be transmitted over a communication system such as a communication network.

More particularly, the coding performed in the coding module 102 utilizes one or more coding parameters which may be, for example, the quantization step size or else the coding mode of some parts or units of the images of the sequence such as the macroblocks.

It will be noted that, in the case in which the images of the video sequence comprise macroblocks, these are coded with a coding mode of intra type or of inter type and a coding parameter may be the ratio between the macroblocks coded with the coding mode of intra type and the macroblocks coded with the coding mode of inter type.

The coding parameter or parameters used on coding are chosen to minimize the distortion, that is to say to render the quality maximum under a given rate constraint.

To do this, a rate control algorithm is used, in known manner, such as a quadratic law linking the image size to the quantization step size as described in Appendix L of the video coding standard MPEG-4 Part 2 (ISO 14496-2).

The bitstream 103 comprising the coded digital signal is transmitted across the aforementioned communication system and the coded signal thus transmitted is represented by the reference 150 as input to a decoding system.

The bitstream input to this decoding system may comprise errors compared to the bitstream output from the coding module 102 on account of its transmission through the communication system and network losses which may possibly occur.

This bitstream 150 is processed by a decoder or decoding module 151 which transforms it into a sequence of decoded images 152.

This sequence is next transmitted to an output peripheral 153 such as a display (monitor, etc.) to be viewed.

The communication system is in particular characterized by one or more parameters representing constraints which are liable to have an influence on the transmission of the signal through the system, or even an influence on the coding and/or the decoding.

By way of example, the following may be mentioned as a parameter of the system:

the bandwidth of the communication system, the filling ratio of a buffer memory used at the decoder 151 before performing decoding operations or, at the coder 102, after having performed coding operations, the processing load at the reception device of the transmitted coded signal and, for example of the system for decoding and display, the delay between the sending of data by the coding system (for example the server) and their reproduction at the decoding system, etc.

Taking account of the rate set point (authorized bandwidth), the possible variations over time of that or those parameters or constraints of the system are used in the most appropriate possible manner to transmit data which could not normally be transmitted.

Thus, the coding parameter or parameters used by the coder 102 are determined in adapted manner, dynamically, taking account of the data rate to respect to make the distortion due to the coding as low as possible, based on the possibilities for variation of those parameters or constraints.

The analysis of the possible variations reveals availabilities (e.g. low network load, low occupancy of the buffer memory, etc.) to transmit supplementary data or, on the contrary, unavailabilities, with, in each case, a degree of urgency.

Figure 2:
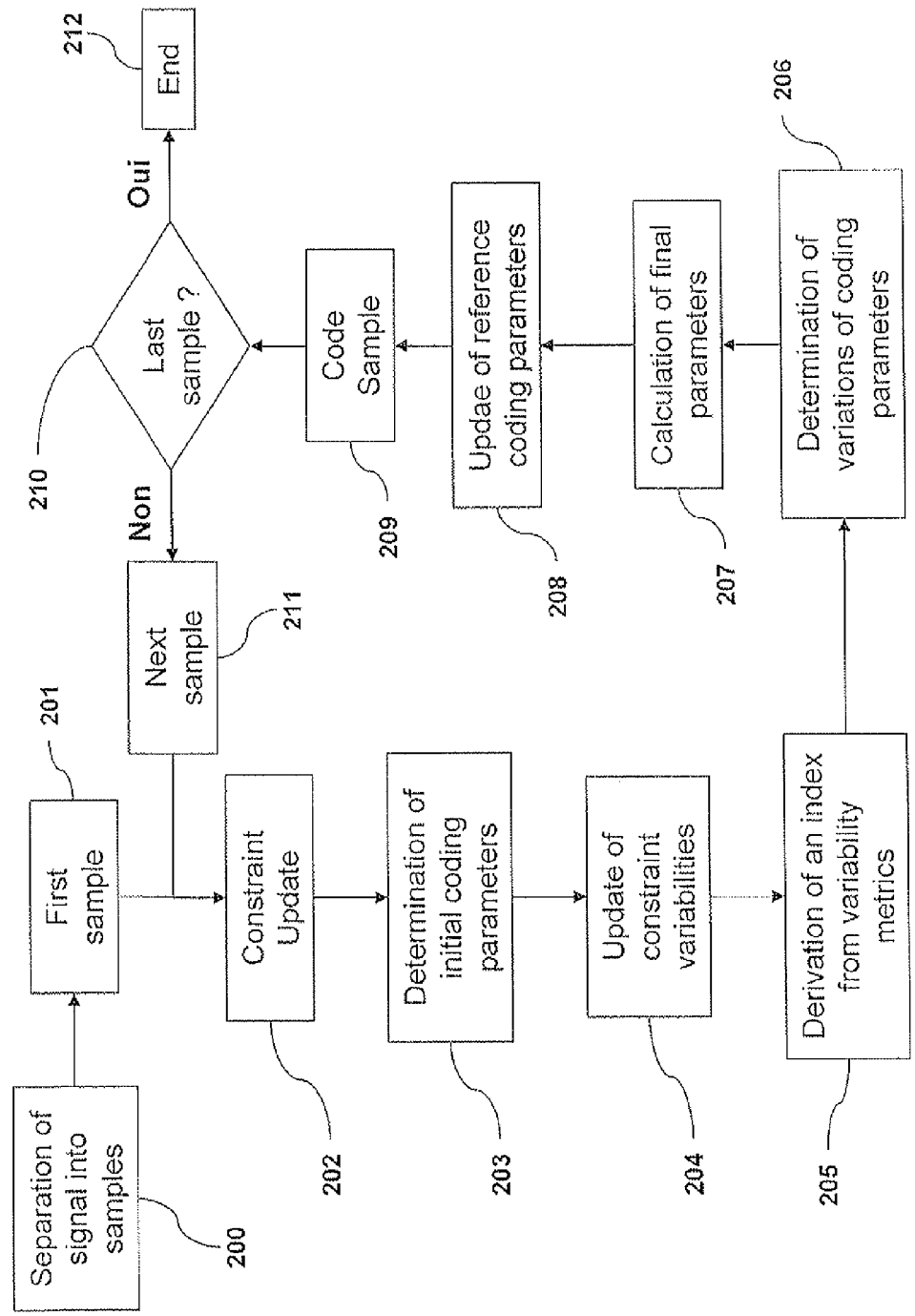
FIG. 2 represents an algorithm on which one embodiment of the method according to the invention depends.

FIG. 2 illustrates an algorithm of an embodiment of the coding method according to the invention which comprises a series of steps which will be detailed below.

This method is, for example, implemented by the execution of a computer program based on that algorithm.

The algorithm of FIG. 2 commences by a step 200 of processing digital data.

During this step, the data are separated into several samples (those samples may be pixels, parts or units of images such as macroblocks, etc.).

It will be noted that the main function of this step is to associate a temporal item of information with the signal to process since the issue will arise below of variability over time of the parameters or constraints of the system.

Alternatively, it could be envisaged to perform analog processing of the signal using. a feedback loop integrating a delay.

During the following step 201, a first sample from the signal is selected for processing, which will enable the processing operations of the signal to be initialized.

The algorithm then comprises a step 202 during which first system constraints or parameters are updated.

More particularly, these values undergo reevaluation in real time which is rendered necessary due to the changing physical conditions (obstacles, movement, other traffic on the network, etc.).

These first constraints are, for example, the authorized rate, the delay between the coding and the decoding of a data packet, the level of filling of one or several buffer memories used in the system, etc.

During the following step 203 determination is made, generally, of a first value of one or several coding parameters so as to minimize the distortion due to the coding, while respecting the rate constraint.

This step, for example, utilizes a known rate control algorithm using for example the quantization step size as coding parameter, and makes it possible to determine a mathematical optimum of the coding parameter or parameters used and which respects or respect the constraints.

By way of example, determination is made of a first value of the quantization step size which, by coding with that step size, makes it possible to satisfy the desired rate (for example 6 megabits per second) and to respect a delay (for example less than 300 milliseconds).

This first value will serve as reference value and will be used subsequently to determine a second value for coding parameters that is adapted, dynamically, to the possible variations over time of one or several constraints or parameters of the system.

The algorithm comprises a following step 204 during which the possible variabilities or variations over time of one or several constraints or parameters of the communication system are determined.

The constraint or constraints concerned in this step may be the same as the first constraints dealt with in step 202 or be different constraints.

Among the constraints that may be envisaged for step 204, the following may be mentioned without being limiting:
- uncertainty in the estimation of the bandwidth of the communication system,
- tolerance of the delay between the coding and the decoding of the data,
- distance relative to the critical thresholds of buffer memory filling, etc.

This operation of updating the variability of constraints is followed by a step 205 which provides for determining an index i expressing the variability of the one or more parameters or constraints of the communication system determined at step 204.

More particularly, step 205 uses the variabilities determined at step 204 to obtain an overall value of variability.

In the embodiment described, the index i expressing the variability of the constraints or parameters of the system may be derived from the magnitudes of variabilities of the following constraints or parameters:
- a level or degree of occupancy L of a buffer memory (for example at the decoder) to compare with the average filling value $L_0$,
- a bandwidth estimated at the value R with an error $\Delta R$,
- A delay D compared to a delay $D_0$ adapted to needs (for example a delay of 0.3 s may be suitable for a video conference according to the content but, if remote control is concerned, a delay of 100 ms may prove unsuitable).

The delay and the level of filling of a memory are often parameters that are linked, since, indeed, a full memory implies a long delay while waiting for the data to be transmitted. However, as these parameters have bearing on different problems, they may be treated separately.

Thus, for the value L, the normalized value $L'=(L-L_0)/L_0$ is calculated.

For the value R, the normalized value $R'=\Delta R/R$ is calculated.

For the value D, the normalized value $D'$ is calculated as follows:

$$D' = \begin{cases} \dfrac{D-D_0}{D_0}, & D \le D_0 \\ a\dfrac{D-D_0}{D_0}, & D_0 \ge D \end{cases}$$

The parameter "a" governs the reactivity of the communication system faced with long delays (in the example chosen a=1).

The values D', L' and R' obtained are then summed and provide a normalized value I. It will be noted that instead of being normalized, the values D, L and R could undergo an operation of temporal smoothing, thresholding or binarization. This is however merely one embodiment since, as delay and buffer memory filling are linked, the normalized value I may be a linear combination of the values D', L' and R'.

Other possibilities may of course be envisaged such as the establishment of an average value of the values D, L and R be they normalized or not, or even processed otherwise, the search for a minimum of the aforesaid values, and the determination of the square root of the sum of the squares of the aforesaid values.

The variabilities of constraints thus determined are then expressed as variability or variabilities of coding parameter(s). For this, the space for the values of I may be segmented to obtain an index i of which the values are indicated under the segments:

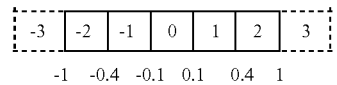

The index i may thus be seen as representing a degree of urgency: the higher the absolute value of i, the more the set point must be respected. Furthermore, the sign of i indicates the direction a priori of evolution of the coding parameters: negative values indicate negative urgency (it no doubt being possible for the quality to be increased) and positive values indicate a positive urgency (the quality having to decrease if the initial coding parameters are properly determined).

Step 205 of determining an index of variability of the constraints is followed by a step 206 using the overall value obtained at step 205 to determine the possible variations, over time, of the first value (reference value) of the coding parameter or parameters determined at step 203.

In general terms, determination is made during this step, on the basis of the possible variations of the constraint(s) or parameter(s) of the communication system, of a tolerance or range of variation of the reference value of the coding parameter or parameters of step 203.

In the embodiment described, the quantization step size is the sole coding parameter used.

By way of example, there could be used as another coding parameter taken alone or in combination with the quantization step size, the image type, the size of the slices, etc.

Determination will now be made by way of example of a means for obtaining the range of variation of a coding parameter such as the quantization step size.

First of all the following notations are to be considered:
- i is the index obtained earlier,
- k is the temporal index of the image in the series of images which constitutes the video sequence,
- $Q'_k$ is the initial quantization step size provided by step 203,
- $Q_k$ is the final quantization step size obtained after implementation of step 206.

The first possibility is to restrain the initial quantization step size to a domain around the preceding quantization step size $Q_{i-1}$. Thus, for each index, lower $\Delta Q_k^{min}$ and upper $\Delta Q_k^{max}$ bounds to the variation in the quantization step size are determined and the final quantization step size is written:

$$Q_i = \begin{cases} Q_{i-1} + \Delta Q_k^{min}, & Q_i' \leq Q_{i-1} + \Delta Q_k^{min} \\ Q_i' & \\ Q_{i-1} + \Delta Q_k^{max}, & Q_{i-1} + \Delta Q_k^{max} \leq Q_i' \end{cases}$$

The values are next truncated to the values that are possible for the codec used (for example the codec described in the MPEG-4 Part 2 standard). The following examples may be given for $\Delta Q_k^{max}$ and $\Delta Q_k^{min}$:

If i=2, there will be very high values of $\Delta Q_k^{max}$ (depending on the codec, for example equal to 10, for the MPEG-4 Part 2 standard), and low $\Delta Q_k^{min}$ values (for example 0);

If i=−2, it will be $\Delta Q_k^{max}$ that is low (for example 0) and $\Delta Q_k^{min}$ will be negative (value equal to −10, for example in the case of the MPEG-4 Part 2 standard).

values of i equal to −3 or 3 indicate maximum urgencies: the choice of the rate control is then maintained.

The second possibility is to calculate a linear combination of the initial value $Q'_i$ and of the preceding value $Q_{i-1}$ in the following form:

$$Q_i = a_k \times Q'_i + b_k \times Q_{i-1}$$

Examples of values are

For a value of k of 3 or −3, $a_k=1$ and $b_k=0$; as a matter of fact, taking into account the maximum urgency indicated by the variability index, the choice of the rate control is kept;

For k=0, $a_k=0.2$ and $b_k=0.8$; the preceding value dominates here in the choice of the rate control.

Step 206 has thus made it possible to determine bounds or coefficients fixing the range of possible variation of the coding parameter used.

During the following step 207 determination is made, on the basis of the possible variations of the first values of the coding parameter or parameters determined at step 206, of a second value of that parameter or those parameters, this second value minimizing the distortion due to the coding under a rate constraint.

This is the determination of the final coding parameters which will be used for the coding of the data prior to their transmission.

More particularly, step 207 makes use of the initial coding parameter or parameters determined at step 203, of the ranges of possible variations obtained at step 206 and of a reference coding parameter or parameters obtained at the following step 208 (which will be described below) but obtained at the preceding iteration (on the preceding sample), for the purpose of generating the final coding parameter or parameters.

Once the final coding parameter or parameters have been determined at step 207, the following step 208 provides for updating of the value of the reference coding parameter or parameters.

By way of example, this updating may consist of attributing to the value of the reference parameters of step 208 the value or values of the final coding parameters obtained at step 207 during the same iteration.

This is moreover the way of proceeding at the time of processing the first sample 201.

According to another example, the reference parameters of the coding step 208 may be obtained by performing the calculation of an average value of the final coding parameters obtained at step 207.

During the following step 209, the final coding parameter or parameters of step 207 are used for the coding of the current sample.

The following step 210 is a test step during which determination is made of whether the processing loop provided by the algorithm must continue.

When the current sample which has just been coded at step 209 is not the last sample of the signal, the following step 211 selects the next sample and the steps 202 and 210 already described are then again executed in relation to this new current sample.

Where the current sample proves to be the last sample of the signal, step 210 is followed by step 212 which terminates the algorithm.

It will be noted that the invention makes it possible to keep a rate control algorithm that is known per se and already present at the coder 102 of FIG. 1 by adding a layer on top of low complexity.

This layer on top is expressed by the additional steps 204 to 208 of the algorithm of FIG. 2.

These additional steps make it possible to use the variability of the constraints or parameters of the communication system to modulate the rate control calculations in order to obtain, in particular, quality smoothing, over time, of the signal, which in this example comprises video sequence.

In the embodiment, the method of coding video, for example in MPEG4 format, is implemented in the form of a computer program or programs.

This program or these programs comprise one or more sequences of instructions of which the execution by a computer, or, more generally, by a programmable communication apparatus, enables the implementation of the steps of the method in conformity with the invention.

Figure 3:
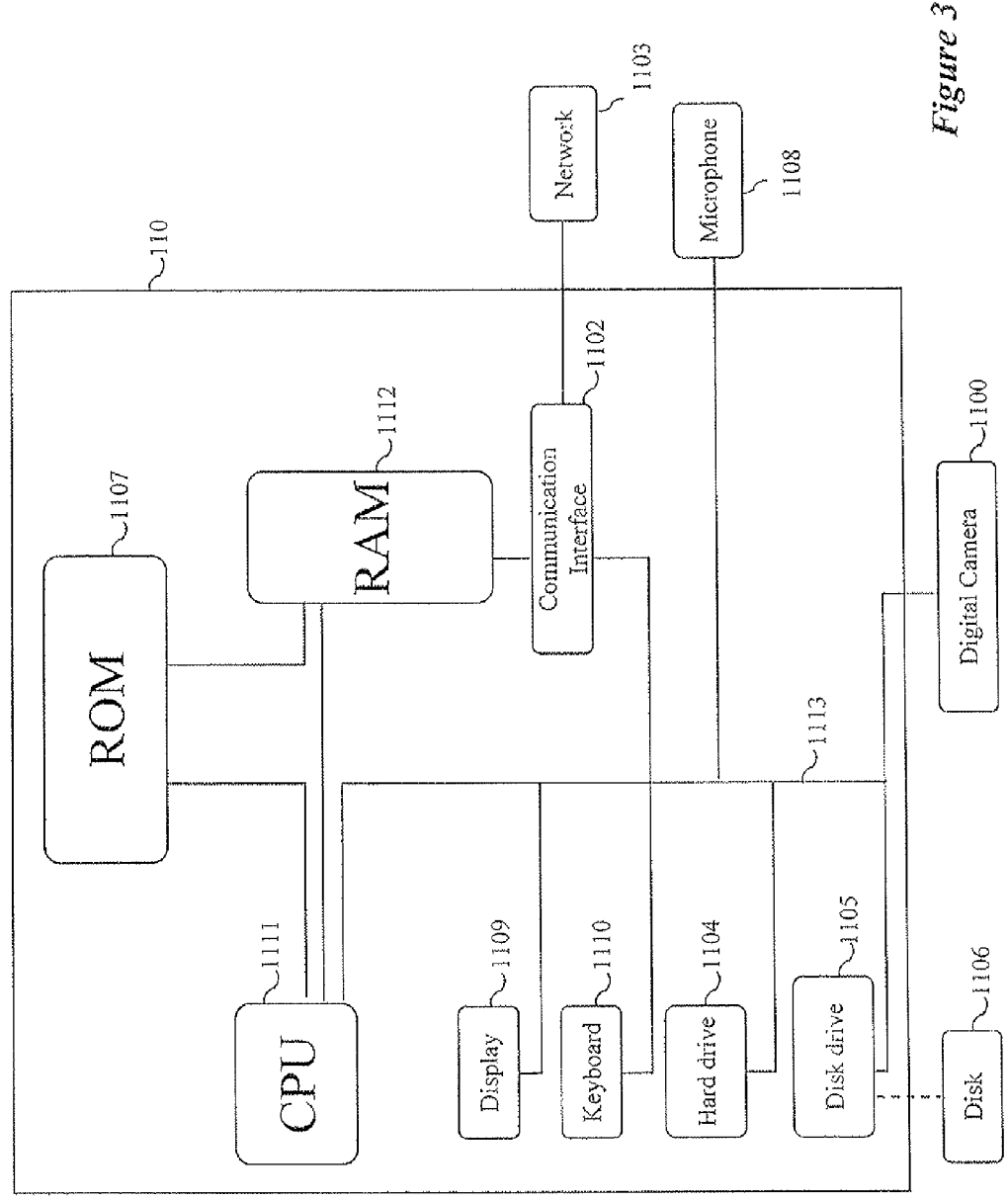
FIG. 3 is a diagrammatic view of a communication apparatus according to the invention.

In general terms, an information storage means, which can be read by a computer or microprocessor, whether integrated or not into that computer, and which may possibly be removable, is adapted to store a program adapted to implement the method in conformity with the invention In FIG. 3, the computer or communication apparatus 300, which may be a microcomputer or workstation, is connected to different peripherals, for example a digital camera 301 for capture of video, or any other device for acquiring or storing images, such as a scanner, providing the computer with videos to transmit. These videos may be stored in the means of storage available to the computer.

It will be noted that the system for coding and transmitting the signal 103 of FIG. 1 is for example integrated into that apparatus 300.

The computer 300 also comprises a communication interface 318 connected to a communication system 320, for example the Internet network, and which is adapted to transmit and receive digital data.

The computer 300 also comprises means for storing data such as a hard disk 312, a diskette drive 314 enabling data to be written onto a diskette 316 and that data to be read. The computer may also comprise a compact disc reader (CDROM or DVDROM), not shown, on which the videos may be stored, as well as a computer card (PC-CARD) reader, not shown.

The executable codes of the program or programs making it possible to implement the different parts of the invention are, for example, stored on the hard disk 312.

According to a variant embodiment, the executable codes of these programs are stored in a ROM ("Read Only Memory") memory 304 of the computer.

The computer 300 further comprises a screen 308 for viewing the videos and a pointing device (not shown), such as a mouse or optical stylus, and/or a keyboard 310 so as to be able to interact with the program.

The computer comprises a central processing unit (CPU) 303, for example a microprocessor, which controls and directs the execution of the instructions of the program or programs of the invention stored on the ROM 304 or on the hard disk 312.

The computer 300 also comprises a RAM ("Random Access Memory") memory 306.

The latter comprises registers for storing the variables created and modified during the execution of the program or programs according to the invention, in particular the variables referred to earlier in the description, in relation to FIG. 2.

The programmable communication apparatus 300 (server) comprises all the means necessary for the implementation of the invention for coding and decoding the data, transmitting and receiving data (for example video), displaying data (for example video), etc.

It will be noted that the system for receiving the coded and transmitted signal 150 of FIG. 1 may be an apparatus of the type represented in FIG. 3.

The invention claimed is:

1. A method of lossy coding of a digital signal to transmit over a communication system, the method comprising:
    determining a first value of at least one source coding parameter which reduces distortion due to the coding under a rate constraint,
    determining possible variations over time of several parameters of the communication system among bandwidth, filling ratio, processing load and delay between the coding and decoding,
    determining possible variations over time of the first value of said at least one source coding parameter which are induced by the possible variations of said several parameters of the communication system,
    determining, based on the determined possible variations of the first value, a second value of said at least one source coding parameter which reduces the distortion due to the coding under a rate constraint, and
    coding the digital signal using the second value of said at least one source coding parameter.

2. A method according to claim 1, wherein a source coding parameter is a quantization step size.

3. A method according to claim 1, wherein a source coding parameter is a parameter mode.

4. A method according to claim 1, wherein the digital signal is a video signal having images which comprise macroblocks, some macroblocks being coded with an intra type or inter type coding mode, a source coding parameter being a ratio between the intra coded macroblocks and the inter coded macroblocks.

5. A method according to claim 1, wherein said several parameters of the communication system are chosen from among several of the following parameters: bandwidth of the communication system, filling ratio of a buffer memory used before the transmission of the coded signal or on reception of the transmitted coded signal, processing load at a receiving device of the transmitted coded signal, and delay between the coding and the decoding.

6. A method according to claim 1, further comprising a step of determining an index i expressing variability of said several parameters of the communication system.

7. A method according to claim 6, wherein the index i is determined on the basis of at least one of the following operations carried out on several of values of bandwidth, of filling ratio, of processing load and of delay between the coding and the decoding: summing of those values, average value of those values, minimum of those values and square root of sum of the squares of those values.

8. A method according to claim 6, wherein the step of determining the second value of said at least one source coding parameter takes account of the index i determined.

9. A device for lossy coding of a digital signal to transmit over a communication system, the device comprising:
    a first value determining unit constructed to determine a first value of at least one source coding parameter which reduces distortion due to the coding under a rate constraint,
    a parameter variation determining unit constructed to determine possible variations over time of several parameters of the communication system among bandwidth, filling ratio, processing load and delay between the coding and decoding,
    a first value variation determining unit constructed to determine possible variations over time of the first value of said at least one source coding parameter which are induced by the possible variations of said several parameters of the communication system,
    a second value determining unit constructed to, based on the determined possible variations of the first value, determine a second value of said at least one source coding parameter which reduces the distortion due to the coding under a rate constraint; and
    a coding unit constructed to code the digital signal using the second value of said at least one source coding parameter.

10. A device according to claim 9, wherein a source coding parameter is a quantization step size.

11. A device according to claim 10, wherein a source coding parameter is a coding mode.

12. A device according to claim 9, wherein the digital signal is a video signal having images which comprise macroblocks, some macroblocks being coded with an intra type or inter type coding mode, a source coding parameter being a ratio between the intra coded macroblocks and the inter coded macroblocks.

13. A device according to claim 9, wherein said several parameters of the communication system are chosen from among several of the following parameters: bandwidth of the communication system, filling ratio of a buffer memory used before the transmission of the coded signal or on reception of the transmitted coded signal, processing load at a receiving device of the transmitted coded signal, and delay between the coding and the decoding.

14. A device according to claim 9, further comprising an index determining unit constructed to determine an index i expressing variability of said several parameters of the communication system.

15. A device according to claim 14, wherein the index i is determined by a determining unit constructed to perform at least one of the following operations on values of bandwidth, of filling ratio, of processing load and of delay between the coding and decoding: summing of those values, average value of those values, minimum of those values and square root of sum of the squares of those values.

16. A device according to claim 14, wherein the second value determining unit takes account of the index i determined.

17. A non-transitory computer-readable information storage means which retrievably sores code instructions of a computer program which when executed by a computer, control the computer to perform a method comprising:

determining a first value of at least one source coding parameter which reduces distortion due to the coding under a rate constraint, determining possible variations over time of several parameters of the communication system among bandwidth, filling ratio, processing load and delay between the coding and decoding, determining possible variations over time of the first value of said at least one source coding parameter which are induced by the possible variations of said several parameters of the communication system, determining, based on the determined possible variations of the first value, a second value of said at least one source coding parameter which reduces the distortion due to the coding under a rate constraint, and coding the digital signal using the second value of said at least one source coding parameter.

* * * * *